United States Patent [19]
Keefer et al.

[11] Patent Number: 5,775,853
[45] Date of Patent: Jul. 7, 1998

[54] MACHINING METHOD AND MULTI-FUNCTION TOOL

[75] Inventors: Gary L. Keefer, West Chester; Stanley C. Weidmer, Cincinnati, both of Ohio; Kazuyuki Hiramoto, Yamanashi, Japan; Gregory Aaron Hyatt, West Chester, Ohio

[73] Assignee: Makino Inc., Mason, Ohio

[21] Appl. No.: 707,233

[22] Filed: Sep. 3, 1996

[51] Int. Cl.⁶ .................................................. B23B 35/00
[52] U.S. Cl. ........................ 408/1 R; 408/56; 408/59; 408/119; 408/130; 408/239 R
[58] Field of Search ....................... 408/1 R, 36, 56, 408/57, 59, 119, 18, 117, 130, 146, 239 R, 224

[56] References Cited

U.S. PATENT DOCUMENTS

| | | |
|---|---|---|
| 3,556,233 | 1/1971 | Gilreath et al. |
| 3,762,036 | 10/1973 | Goebel et al. |
| 3,794,435 | 2/1974 | Haley . |
| 3,893,355 | 7/1975 | Maastricht ........................... 408/60 |
| 4,032,250 | 6/1977 | Lavallee . |
| 4,044,558 | 8/1977 | Benson . |
| 4,082,472 | 4/1978 | Mossner et al. |
| 4,529,340 | 7/1985 | O'Dell . |
| 4,583,394 | 4/1986 | Mitchell ............................... 408/57 |
| 4,623,287 | 11/1986 | Eckhardt et al. ..................... 408/36 |
| 4,705,435 | 11/1987 | Christoffel . |
| 4,794,841 | 1/1989 | Kemmler et al. |
| 4,913,602 | 4/1990 | Peter et al. |
| 4,922,952 | 5/1990 | Kemmler . |
| 4,925,498 | 5/1990 | Kemmler . |
| 4,951,578 | 8/1990 | Von Haas et al. ................... 408/56 |
| 4,979,853 | 12/1990 | Field . |
| 5,033,918 | 7/1991 | Eysel et al. |
| 5,116,171 | 5/1992 | Gerk et al. |
| 5,152,166 | 10/1992 | Brock et al. |
| 5,163,790 | 11/1992 | Vig . |
| 5,218,994 | 6/1993 | Jeschke . |
| 5,304,019 | 4/1994 | Klee et al. |
| 5,326,198 | 7/1994 | Romi ..................................... 408/57 |
| 5,368,420 | 11/1994 | Gerk et al. |
| 5,378,091 | 1/1995 | Nakamura ............................ 408/1 R |
| 5,395,187 | 3/1995 | Slesinski et al. ..................... 408/56 |
| 5,419,661 | 5/1995 | Meachum . |
| 5,452,742 | 9/1995 | Vidal et al. |
| 5,562,373 | 10/1996 | Willingham et al. ................ 408/56 |
| 5,567,093 | 10/1996 | Richmond ............................ 408/57 |
| 5,649,714 | 7/1997 | Uchida et al. ....................... 408/57 |
| 5,674,031 | 10/1997 | Bilz et al. ............................ 408/57 |

FOREIGN PATENT DOCUMENTS

| | | | |
|---|---|---|---|
| 279407 | 12/1986 | Japan ................................... 408/146 |
| 279408 | 12/1986 | Japan ................................... 408/146 |
| 190613 | 7/1994 | Japan ................................... 408/146 |

*Primary Examiner*—A. L. Pitts
*Assistant Examiner*—Adesh Bhargava
*Attorney, Agent, or Firm*—Dinsmore & Shohl LLP

[57] ABSTRACT

An improved device and method for use in machining a workpiece, which includes a tool body with a machining tool having two machining surface, wherein one of the machining surfaces is being selectively movable between a retracted position and an extended position. A supporting mechanism is sized and configured to substantially restrict movement of the machining tool relative to the tool body while the one machining surface is positioned in the retracted position. Preferably, the supporting mechanism includes an interior surface having a frustoconical-shaped tapered configuration, and the reciprocable machining surface has an engageable surface sized and configured to be frictionally engaged against the interior surface. In a preferred embodiment, the interior surface has an angle relative to the longitudinal axis of the tool body from about 20 to about 50 degrees, and more preferably about 40 degrees. A drive mechanism can be disposed in the tool body for selectively and quickly moving the machining tool from its retracted or supported position for movement to its extended position.

22 Claims, 5 Drawing Sheets

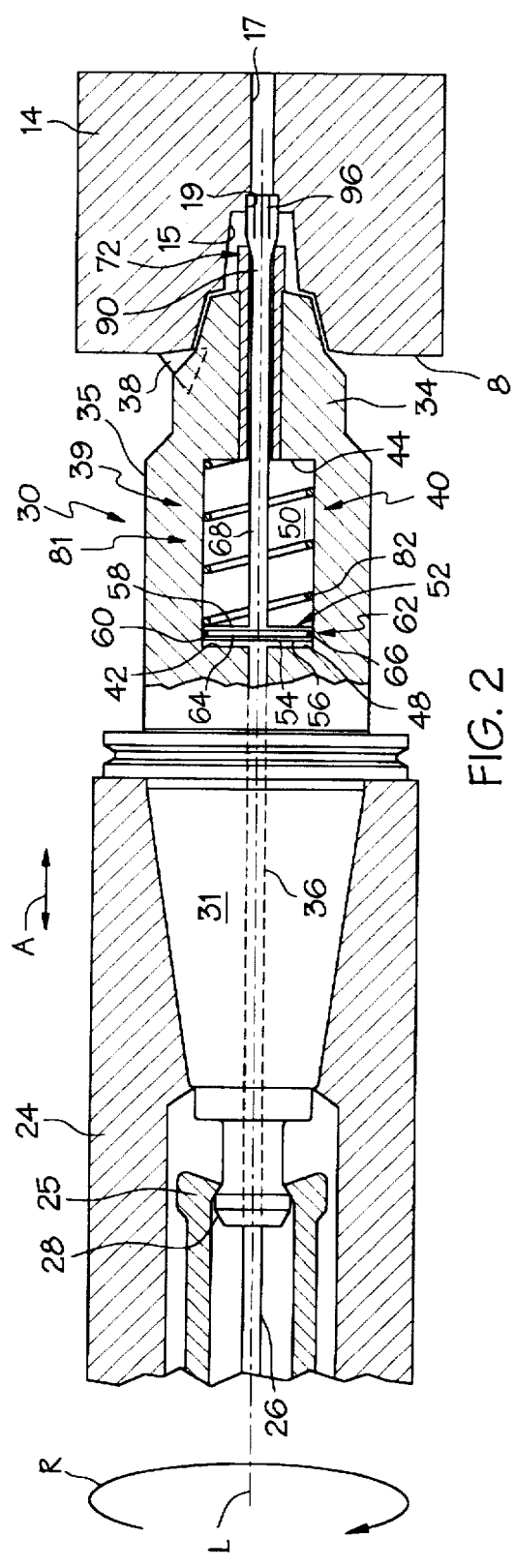
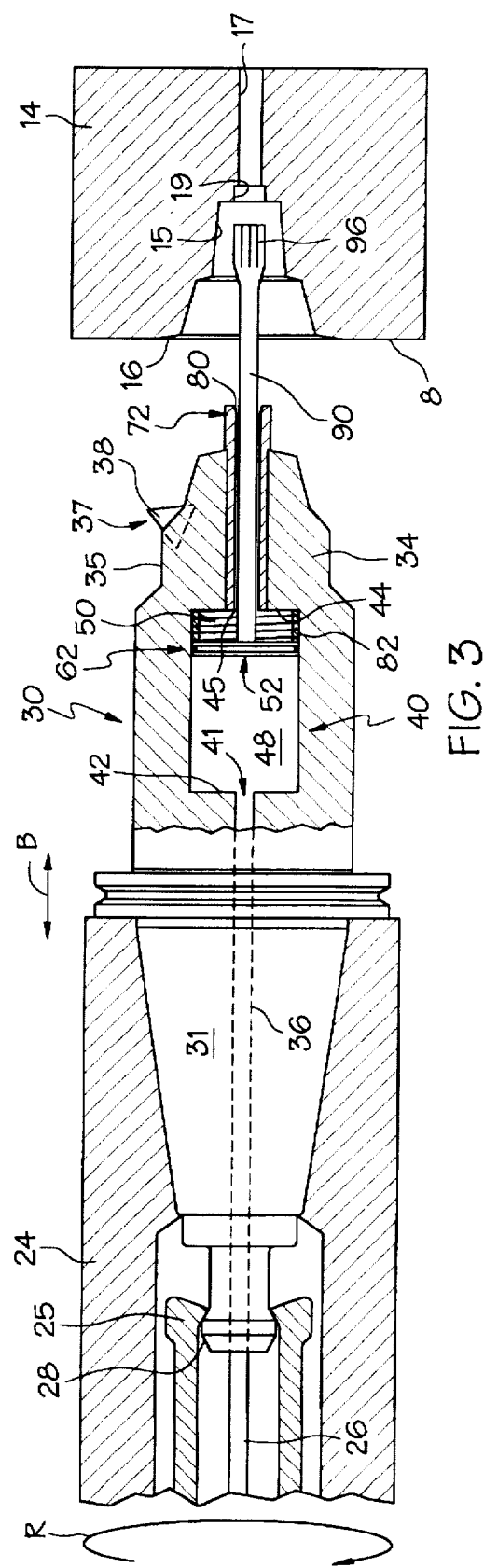
FIG. 2
FIG. 3

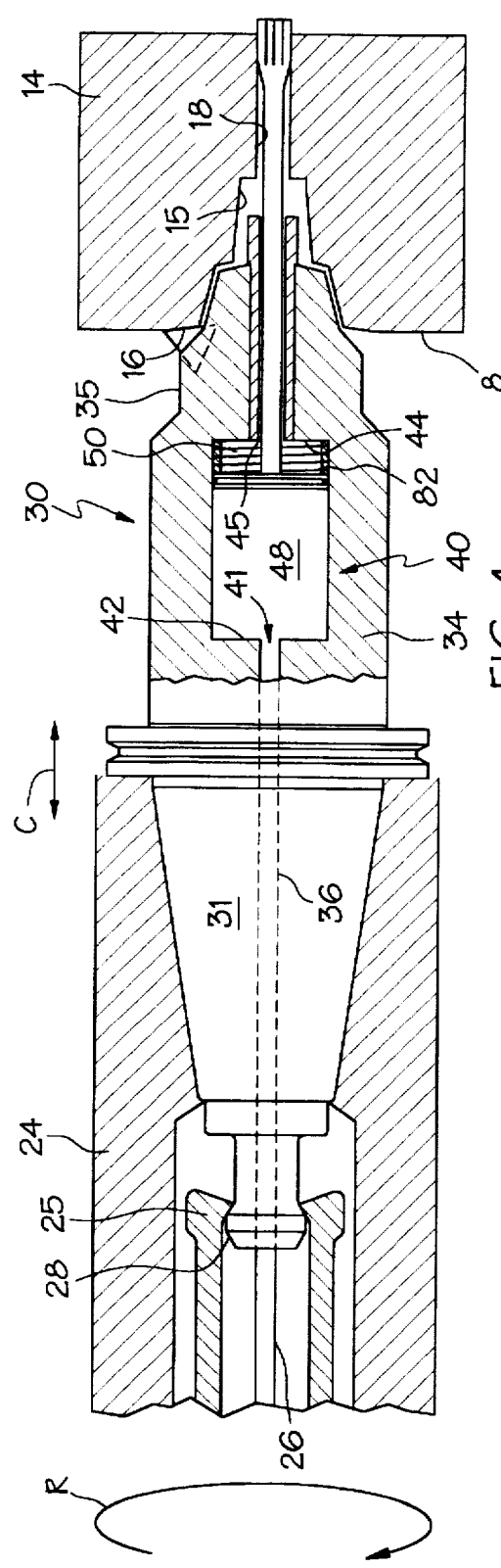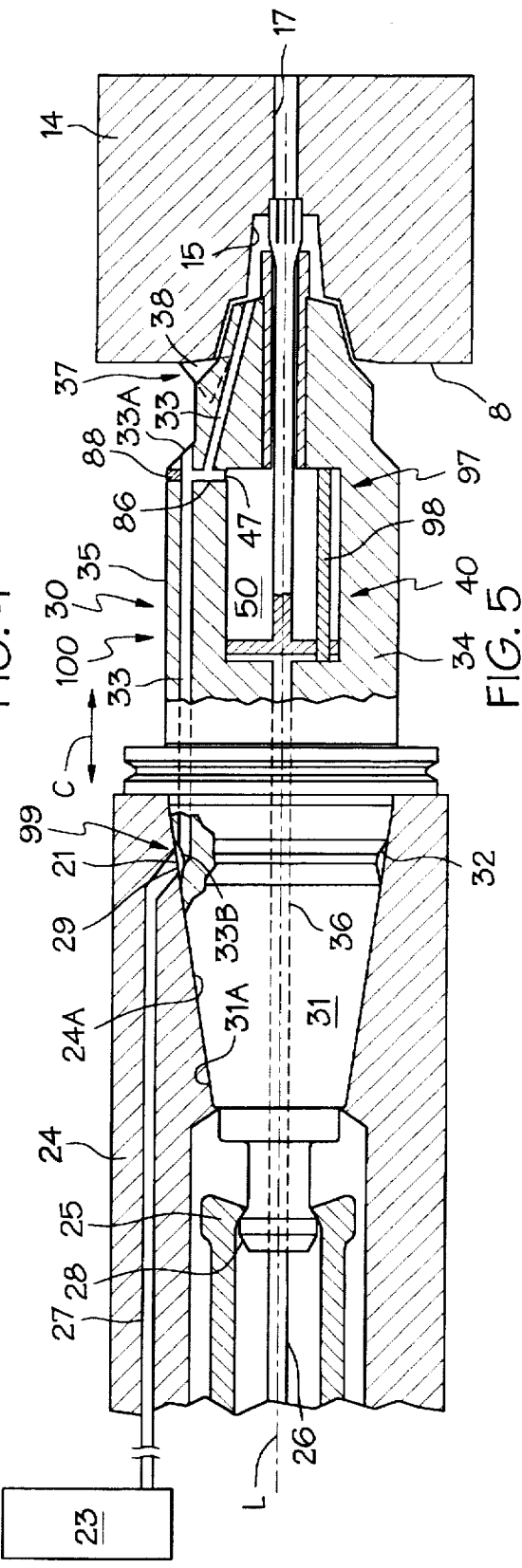

5,775,853

1

MACHINING METHOD AND MULTI-FUNCTION TOOL

TECHNICAL FIELD OF THE INVENTION

The present invention relates generally to a device and method for machining and finishing openings in a workpiece, and more specifically, to a combination device for selectively, accurately and conveniently machining a plurality of concentric openings in a workpiece.

BACKGROUND OF THE INVENTION

Often, machining operations require machining and/or finishing openings and surfaces of a workpiece which include a concentric axis, yet require various machining surfaces for accommodating different machining requirements. For example, when machining a valve seat and a bore hole for the stem of the valve in the block of an internal combustion engine, it is critical that the valve seat and bore hole be aligned concentrically so that an air tight seal can be formed by the mating metal surfaces (e.g., the valve seat and the valve head). Traditionally, this machining has been done by two separate tools, one for machining the valve seat and another for reaming the bore of a valve guide hole. However, the desired accuracy and alignment of the seat with the bore was often compromised when the tools were exchanged. A combination device has also been used that could first machine the valve seat using insert cutters, then, a drive mechanism, such as a draw bar, could extend a machining tool through the center of the device for reaming the aligned guide hole. These combination devices are known as "squirt reamers," as the machining tool is "squirted" forward after the valve seat machining is completed.

In "squirt reamers," a starter or pilot hole is cut in the workpiece by the machining tool while in a retracted position. In prior devices, however, the machining tool was not sufficiently secured when in the retracted position to prevent movement thereof, and the vibrations resulting from simultaneously machining the seat and forces encountered in reaming the starter hole could both adversely affect the concentricity of the seat and the pilot hole. If the pilot hole is not properly and concentrically aligned with the valve seat, then, when the guide hole is reamed, an increased likelihood exists that the resulting guide hole will not be concentric with the valve seats, as required. To reduce the possibility of misalignment and to improve the likelihood that the guide hole would have the desired straightness and concentricity, these "squirt reamer" tools were not retracted to extend the machining tool. Rather, their position relative to the workpiece remained unchanged, and the machining tool was slowly and carefully actuated using either a draw bar or hydraulics. In order to minimize possible machining error, the feed rate was slowly and carefully modulated using various valve assemblies and control systems.

In almost all machine tool operations, the friction between the tool and workpiece generates tremendous amounts of heat energy, which can reach temperatures of 2000° F. (1100° C.) and above. If left unchecked or uncontrolled, such heat can severely damage (e.g., leading to cracking or fracturing) the tool, thus reducing its usable life, making machine tool operations more unreliable and expensive, and reducing the quality and precision of the workmanship. In addition, heat generated friction can discolor the workpiece, and can damage or remove temper or heat treatments. It is commonly known in the industry that coolant can be introduced to the machining area to reduce friction between the tool and workpiece by maintaining (e.g., via spraying) a thin film of coolant fluid between the machining tool and the workpiece, and to help remove heat energy generated in machine tool operations.

Although coolant fluid can be supplied to the machining area, it is often difficult to insure that such fluid actually makes its way to the interstices between the tool and all of the workpiece surfaces being machined. Additionally, fluid tends to evaporate quickly due to the high temperatures involved in machining operations. Thus, larger volumes of coolant fluid must generally be continuously supplied to the machining area for the machining tool to operate effectively. This need to keep a thin continuous film of coolant fluid between the machining tool and the workpiece becomes even more problematic in operations where coolant fluids cannot be easily introduced in close proximity to the machining areas while the machining tool is engaged with the interior surface of the workpiece.

During use, the machining tool can also become loaded with particles or recently cut chips from the workpiece, which in turn, reduces the accuracy and effectiveness of the tool through deteriorating machining ability, and/or clogging of conventional coolant fluid supply openings. It is obviously preferred that the potential for this undesired loading of particles be reduced, and that any loaded particles be removed from the machining tool as quickly as possible. Typically, nozzle arrangements, such as an external cleaning jet, are provided independent of the tool, for injecting coolant fluid at increased velocities toward the workpiece to wash away particles, to remove particles already loaded on the work surface, and to cool the machining tool and the workpiece. As mentioned before, it is often very difficult to insure that the fluid sprayed in this way actually reaches the most critical areas of the tool/workpiece interface, and such independent coolant spray set-ups further complicate the machine tool set up and process.

Other attempts to deliver coolant fluid to the machining area have included similar supplies of air or other pneumatic carriers. As with externally applied liquid coolants, when pneumatic carriers are used, resulting turbulence can hinder the machining operations, and often fluid cannot infiltrate into the actual machining area. Previously, attempts to address these two requirements of cooling and cleaning the machining tool and workpiece have tended to reduce the accuracy and utility of the tool, such as by requiring inconvenient, expensive, and complex arrangements of nozzles and supply lines customized for each machining operation.

As can be seen, currently available machining tools for machining a valve seat, and then reaming the guide hole for the valve stem, have a number of shortcomings that contribute to the complexity of the tool or reduce their accuracy in machining operations. There exists a need in the industry for a "squirt reamer" that can accurately and simultaneously machine the valve seat and can provide accurately a concentric starter hole for the reaming operations, so that the device and workpiece can be disengaged, whereby, the machining tool can be quickly actuated without the need for carefully controlling the actuation of the machining device with a complex system of fluid modulating valves. It is also desirable to provide an improved machining device which can be quickly interchanged with other standard tools for use with machining centers and other multi-purpose machining set ups.

SUMMARY OF THE INVENTION

It is an object of the present invention to provide a device that addresses and overcomes the above-mentioned problems and shortcoming in the machine tool industry.

It is another object of the present invention to provide an improved device that is usable with an automatic tool changing assembly.

Still another object of the present invention is to provide an improved device that utilizes through-spindle coolant to quickly actuate a machining tool.

It is a further object of the present invention to provide an improved device that accurately and concentrically machines a starter hole in a workpiece while the valve seat is machined.

Another object of the present invention is to provide an improved device that can automatically and precisely provide coolant or other fluid for removing recently cut chips from the working area.

It is yet another object of the present invention to provide an improved device that uses a pneumatic spring to assist in returning a machining tool from the actuated or extended position.

A further object of the present invention is to provide an improved device that uses a drive mechanism to move the machining tool into an actuated position, and also enables movement of a machining center relative to the workhead for machining between operations.

Additional objects, advantages, and other features of the invention will be set forth and will become apparent to those skilled in the art upon examination of the following, or maybe learned with practice of the invention.

To achieve the foregoing and other objects, and in accordance with the purposes herein, the present invention comprises an improved device for use in machining a workpiece which requires a plurality of concentric surfaces to provided and/or otherwise machined. In accordance with a preferred embodiment of the present invention, the device includes a tool body with a machining tool having a first machining surface for machining the workpiece, and being selectively movable from a supported or retracted position to an extended position. A supporting mechanism is sized and configured to substantially restrict movement of the machining tool relative to the tool body while positioned in the retracted position, and can preferably include an interior surface adjacent the opening of the tool body having a frustoconical-shaped tapered configuration. The machining tool has a correspondingly engageable surface sized and configured to be supported and/or frictionally engaged against the interior surface. In one preferred embodiment, the interior surface has an angle relative to the longitudinal axis of the tool body from about 20 to about 50 degrees, and more preferably about 40 degrees. A drive mechanism can be disposed in the tool body and connected to the machining tool for selectively and quickly reciprocating the machining tool between its retracted and extended positions.

The device also preferably includes a second machining surface attached to the tool body for providing the ability to selectively machine another portion of the workpiece and having a concentric axis with the first machining surface discussed above. The device can further comprise a pneumatic spring in the tool body for selectively returning the machining tool from the actuated position to the retracted position. In another embodiment of the present invention, the device includes a connector radially offset from the longitudinal axis. The connector, such as a annular groove, is configured to enable quick and automatic establishment of fluid communication between the fluid supply system and the tool body when the device is mounted on and engaged by a machine spindle. A fluid passageway disposed in said tool body can have an opening on the peripheral surface of the tool body to either the first or second machining surfaces for accurately and precisely delivering fluid in close proximity to the machining surfaces.

The present invention also includes an improved method for machining an opening in a workpiece. A device machines the workpiece with the first machining surface while the machining surface is positioned in the supported or retracted position. Another portion of the workpiece can be machined by the second machining surface at any time during the operation of the device. The machining tool can be removed from the supporting or securing mechanism, and moved to the extended position, where it then further machines the workpiece with the first machining surface. In a preferred embodiment, the method of the present invention includes disengaging by retracting the device from the workpiece prior to reciprocating the first machining tool from its supported or retracted position to its extended position.

In a preferred embodiment of the present invention, fluid communication is established quickly and automatically between the fluid supply system and the fluid passageway when the tool body is mounted on or engaged by a machine spindle having such a fluid supply system. Fluid is routed through the fluid passageway, and is delivered in close proximity to one or more of the machining surfaces, as desired.

BRIEF DESCRIPTION OF THE DRAWINGS

While the specification concludes with claims particularly pointing and distinctly claiming the present invention, it is believed the same will be better understood from the following description taken in conjunction with the accompanying drawings in which:

FIG. 2 is a partial vertical sectional view of a squirt reamer device made in accordance with the present invention and illustrating an exemplary arrangement which the device is used for machining a valve seat in a workpiece and boring a pilot hole;

FIG. 3 is the partial vertical sectional view of the device of FIG. 2, illustrating the tool device having been disengaged from the workpiece following initial machining procedures, and wherein the machining tool has been reciprocated to its extended position;

FIG. 4 is the vertical sectional view of device the of FIG. 3, illustrating the device machining a hole in a workpiece with its first machining surface in the extended position;

FIG. 5 is a vertical sectional view similar to FIG. 2, illustrating an alternative embodiment of a squirt reamer style device made in accordance with the present invention;

DETAILED DESCRIPTION OF THE PREFERRED EMBODIMENTS

Figure 1:
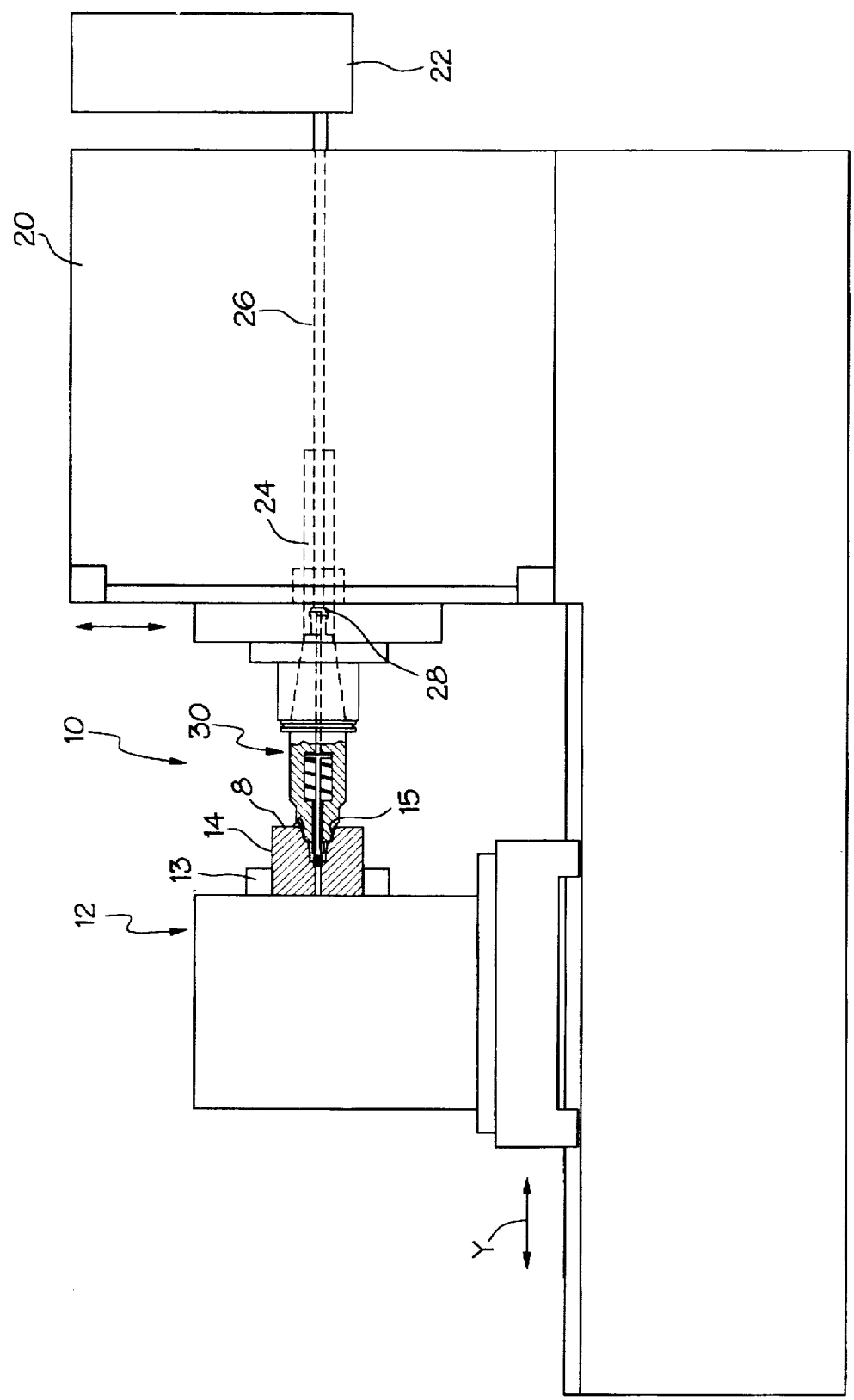
FIG. 1 is a schematic elevational and partial cross sectional view of a machining center having a machine spindle with through-spindle fluid communication between a fluid supply and a preferred embodiment of a tool device of the present invention engaging a workpiece.
Figure 6:
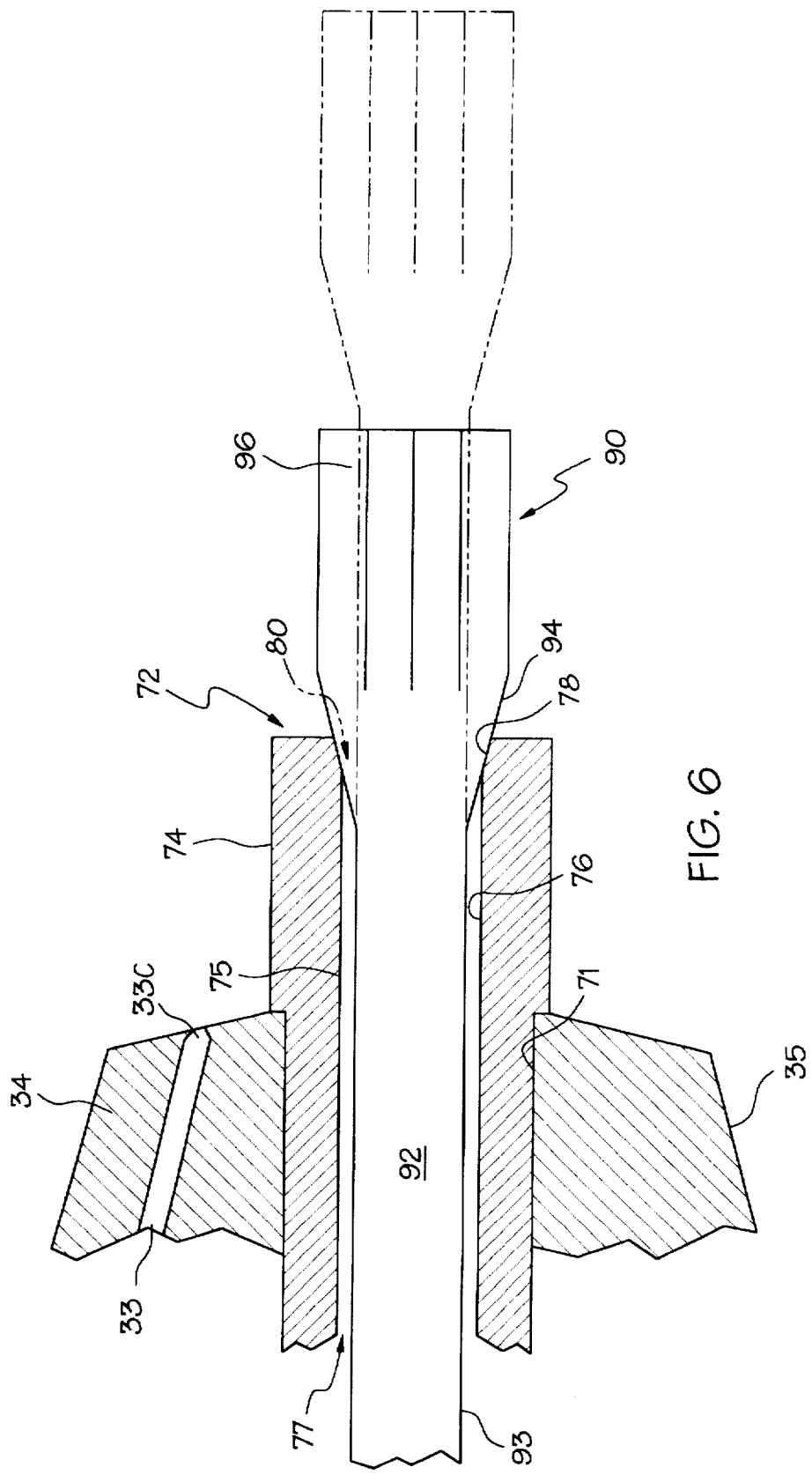
FIG. 6 is an enlarged vertical sectional view of the distal end of the device of FIG. 2.

Referring now to the drawing figures in detail, wherein like numerals indicate the same elements throughout the views, FIG. 1 illustrates an exemplary working area 10, which might typically comprise a machining station or center 20 having a machine spindle 24, which can be rotated at various speeds by a power source (not shown), and a workhead 12 having a workpiece 14 attached thereto using fixtures (e.g., clamps 13) and techniques known in the industry. Workpiece 14 is illustrated as a single exemplary structure having a rough cut opening 15 which typically requires further machining. For example, an opening 15 might require an entry chamfer, counterbore or the like adjacent its face (e.g., face 8), as well as a smaller bore or guide hole (e.g., see hole 17 in FIG. 2). In operation, the device 30 and workpiece 14 are generally rotated or moved relative to one another as the device 30 is brought into contact with the workpiece 14 (see arrow "Y") in order to enable machining operations.

The work area 10 is illustrated as also including a fluid supply system 22 that generally can provide a constant source of pressured fluid to be routed through the spindle 24 (via spindle passageway 26) and through device 30 (via the tool passage 36 to the first chamber 48 of the cylinder 40). Machining centers 20 often are provided with through-spindle coolant systems which can be taken advantage of with the present invention, as will be understood from the present description.

As seen in FIGS. 1–4, the combination machine tool device 30 of the present invention is preferably adapted and configured with a tool holder 31 for use with a machining station or center 20 having a machine spindle 24 which can be rotated at varying speeds by a power source (not shown), and which can quickly and automatically receive and secure one of a plurality of tools for various operations (i.e., rotating, vibrating or oscillating). A machining station or center 20 typically has a synchronized system, such as an automatic tool changer (not shown), for quickly and automatically interchanging and utilizing any if a variety of multiple machining tools or devices at one machining station 20, thereby allowing a machining station or center 20 to provide greater utility and/or a range of operations, (i.e., it need not be dedicated to a single or predetermined operation or use of a single type of tool).

Any assembly for engaging (e.g., 25) (i.e., clamping or otherwise securing) a device 30 in a generally cantilevered fashion with the machine spindle 24, such as a drawbar, a collet, a mandrel device, or other devices known in the industry, can be used so long as fluid can be provided to the device 30 adjacent a spindle/tool interface 28 while the device 30 is in use (e.g., rotating). A preferred engaging assembly 25 allows for quick interchange of tools and the automatic provision of fluid communication between the spindle passage 26 and the tool passage 36 at device/spindle interface 28, without the need for separately hooking up hydraulic lines or other fluid connections. The automatically sealing device/spindle interface 28 might be provided in a variety of structural arrangements, including O-ring seals and the like adjacent device/spindle interface 28, and its exact structural arrangement may vary among particular applications. When the device 30 is not engaged with the machine spindle 24, mechanisms, such as shut off valves, known in the industry, can be used to terminate the flow of fluid adjacent the distal end of the spindle passage 26.

Referring now to FIG. 2, device 30 is illustrated as comprising a tool body 34 having peripheral surface 35, which might typically be provided as steel or aluminum alloys which has been surface-hardened and/or coated for abrasion and wear resistance so that the device 30 can be used with an intermittent or even a dry fluid delivery, and for durability and resistance to abrasions on the peripheral surface 35. The structure of the tool body 34 is configured in a longitudinally extending generally cylindrical shape having a longitudinal axis "L," and may be preferably similarly configured to a common plunge cutter or form tool known in the industry. A variety of rigid materials available in the industry can be used for the structure of the tool body 34 so that it maintains its structural integrity in the desired form during the machining operations, preferably at rotational speeds from about 1,000 revolutions per minute ("rpm") to about 20,000 rpm, and more preferably about 10,000 rpm. Illustrative examples of materials which might be used include aluminum alloys, steel alloys, or the like. An aluminum alloy is a preferred material if there is a need for a lighter weight device, which might be preferred when the device 30 is interchanged in a machine spindle 24 in an automatic tool changing system.

Preferably formed within the tool body 34 and extending along the longitudinal length of device 30 is a tool passage 36. Both the tool body 34 and tool passage 36 are preferably aligned and located such that the device 30 and the tool passage 36 share the same longitudinal axis of rotation (e.g., along axis L). As will be better understood from the description herein, this coaxial orientation of the device 30 and the tool passage 36 is preferred so that the interchanging of tools made in accordance herewith (i.e., quick change engagement/disengagement with a machine spindle, securing the device 30 in place and establishing fluid communication between the spindle passage 26 and the tool passage 36) can be accomplished quickly and automatically upon attachment of device 30 to a machine spindle 24, and to preserve balance in the device 30 so that eccentricities which could cause vibrations of device 30 during use are minimized. In this regard, off-centered routing of a tool passage (s) 36 within the device 30 could similarly be employed, as will be discussed later, but in such cases, it would be preferred to make such supply tube(s) (e.g., 36) substantially symmetrical within the device 30 to best preserve balance during high speed rotation.

Locating tool passage 36 in the device 30 and enabling fluid to be routed therethrough also provides an effective heat sink to assist in dissipating thermal energy generated during machining operation, which further minimizes undue thermal expansion of the device 30. If the device 30 were subjected to extreme temperatures, its effective outer diameter would increase, which could result in the accuracy of machining operations being compromised due to the relative position of the various machining surface being altered or shifted.

Fluid passage 36 can also advantageously provide fluid communication between a fluid supply system 22 and the first or rearward chamber 48 of cylinder 40 when the device 30 is attached to the machine spindle 24, and is sized so that an adequate volume of fluid can be delivered timely, as desired, through device 30 to the first chamber 48. Increasing fluid pressure in the first chamber 48 actuates the piston 52, and assists in maintaining the machining tool 90 in its actuated or extended position (see FIG. 3) and engaged properly with the workpiece 14 for machining the workpiece 14 (e.g., reaming the valve guide hole 18). Although the actual dimensions of the tool passage 36 will vary depending on the particular application, in an exemplary embodiment for use as a squirt reamer type device, the tool passage 36 might have a diameter from about 0.25 inches (0.65 cm) to about 0.50 inches (1.3 cm), and preferably about 0.37 inches (0.95 cm).

A drive mechanism 39 for actuating a machining tool 90 can be provided within the tool body 34, and may preferably include a longitudinally oriented cylinder 40 having a first chamber 48 and a second chamber 50 that are separated by the head 54 of a reciprocating piston 52. As can be appreciated by those skilled in the industry, the respective volumes of the first and second chambers 48 and 50 will vary and change depending on the relative position of the piston 52. For example, when the piston 52 is in its retracted position, as shown in FIG. 2, the second chamber 50 will have a volume greater than the volume of the first chamber 48.

A cylindrical elongated stem 68 generally extends away from the head 54 of the piston 52. Typically, the head 54 and stem 68 might preferably be integrally formed; however, it is contemplated that these members may be formed as separate pieces that are rigidly connected using techniques and assemblies known in the industry, such as a threading arrangement, welding, or the like.

Interposed preferably between the frontward face 58 of the head 54 and the distal axial surface 44 of the cylinder 40 is a return assembly or biasing arrangement 81 for returning the piston 52, and hence, the machining tool 90 and first machining surface, to the retracted position. A compression or bellvill spring 82 can be used with the biasing arrangement 81, and the spring 82 should have a spring constant sufficient to assist in returning or biasing the piston 52 (and machine tool 90) from the actuated or extended position, as illustrated in FIGS. 3 and 4, to the retracted or supported position (FIG. 2). As explained in greater detail below, and illustrated in FIGS. 5 and 7, a pneumatic spring 83 also can be utilized to assist in returning the piston 52 and machining tool 90 to the retracted or supported position. In operation, the pneumatic spring 83 can be used in conjunction with increased fluid pressure in the forward or second chamber 50 to assist in pushing rearwardly on the piston 52 and moving it from the extended or actuated position, and to the supported or retracted position. As will be understood, in the retracted position, the supporting mechanism 72 will support, grip, interlock with, and/or otherwise secure the machining tool 90, as discussed in greater detail below.

The first and second chambers 48 and 50, respectively, can be fluidly separated by a seal 62 (see FIG. 3) or one or more piston rings (not shown) preferably provided between the radial wall 46 of the cylinder 40 and the outer peripheral surface 60 of the head 54. In certain embodiments, the seal 62 may be sufficiently provided by selecting and accurately fitting the outer diameter of the radial surface 60 and the interior surface 46 of the cylinder 40 such that a sufficiently tight fit is established, yet, where the piston 52 can still reciprocate in the cylinder 40.

To further enhance the seal 62 between the first and second chambers 48 and 50, respectively, a groove 64 can be formed in outer periphery 60 of the piston 52, and a positive seal mechanism, such as an O-ring 66 or the like, may be provided. A positive seal mechanism 66, which is positioned in the groove 64, might have a slightly larger outer diameter and a slightly smaller inner diameter than the groove 64 in order to facilitate formation of a reliable fluid tight seal 62 between the radial surface 60 of the piston 52 and the radial surface 46 of the cylinder 40. The seal 62, however established, should not obstruct with the reciprocation of the piston 52. As will be appreciated, the seal 62 prevents fluid from leaking or otherwise flowing between the first chamber 48 and the second chamber 50. Maintaining a seal 62 between the first and second chamber 48 and 50, respectively, can be more important when different types of fluid (e.g., air or liquid as opposed to more viscous cutting fluid or coolant) are used in the first and second chambers 48 and 50, respectively.

In another embodiment of the present invention, if the same type of fluid is used in both first and second chambers 48 and 50, respectively, the negative impact that can be encountered by leakage of fluid between the chambers 48 and 50 is reduced. As such, the seal 62 may be implemented, when the same type of fluid is utilized in both chambers 48 and 50, to allow for some "leakage" to reduce the frictional engagement between the radial face 60 and the radial wall 46.

It is also contemplated that the drive mechanism 39 of the present invention can include a drawbar or other assembly for mechanically actuating a machining tool (e.g., 90) in a device (e.g., 30).

Referring now to FIGS. 2–7, a supporting mechanism 72 for preventing shifting or other movement of the machining tool 90 and its first machining surface (e.g., 96), relative to the tool body 34, while machining a starter hole 19, is preferably provided in device 30. As those skilled in the industry will appreciate and understand, a device (e.g., 30) will vibrate while in use, and a machining tool (e.g., 90) can encounter external forces, such as rotational torque on the machining tool 90 or irregularities in the workpiece (e.g., 14), that can slightly displace or shift the machining tool relative to the device. Supporting mechanism 72 is illustrated as taking the form of a sleeve or bushing sized and configured to substantially align and secure machining tool 90 in a secured and/or supported position so that first machining surface (e.g., 96) does not shift or otherwise vary from its preferred aligned concentric position relative to the device 30 and its longitudinal axis (e.g., L) while being used in machining operations while machine tool 90 is in its retracted or supported position. Drive mechanism 39 can be used in the present invention to remove machining tool 90 from the retracted or supported position. In this way, a more accurate, predictable, and repeatable first portion (e.g., a pilot or starter hole for the guide bore) of a workpiece can be machined by first machining surface 96.

In an exemplary embodiment, a tubular shaped bushing 73 can be received in the bore hole 70 of the tool body 34, and may extend coaxially along the longitudinal axis "L" of the device 30. Bushing 73 can extend or protrude beyond the distal end of tool body 34, preferably so that first machining surface 96 can be secured or supported and positioned properly to machine a pilot or starter hole 19 as second machining surface 37 is machining first portion 16. Any techniques or structures known in the industry for securing a bushing (e.g., press-fit, interference-fit, spot welded, threaded attachment, etc.) to prevent both axial and radial relative movement can be used. It is preferred that the bushing 73 be exchangeably secured within the bore hole 70 so that bushings of different sizes and configurations can be substituted within the bore hole 70, and so that periodic maintenance and/or replacement of supporting mechanism 72 can be easily accomplished.

Preferably provided along the interior surface 76 of the bushing 73, and in close proximity with an opening 80 of supporting mechanism 72, is an outwardly extending, generally frustoconical-shaped or otherwise tapered surface 78 that can be generally configured as a chamfer. The tapered surface 78 is preferably sized and configured to receive and substantially support or secure the engageable surface 94 of the machining tool 90 in the supported or retracted position when the machining tool 90 is moved from its actuated or extended position to its retracted or supported position by the return assembly or biasing arrangement 81. To receive and substantially support or secure the engageable surface 94 of a machining device 90, the angle of the tapered surface 78 relative to the longitudinal axis "L" should be substantially corresponding to the slope of the engageable surface 94 of machining tool 90, and the angle of the tapered surface 78 can preferably be from about 20° to about 50°, and preferably about 40°. Surface friction between the outer surface 93 of the machining tool 90 and the tapered surface 78 is usually sufficient to maintain the machining tool 90 in the secured or supported position, and use of a frictional interface for securing is preferred. While other securement structures (e.g., locking surfaces, keyways, grooves, ect.) might also be employed, it is contemplated that friction alone will be preferred in most applications to facilitate moving or actuating the machining tool (e.g., 90) for quick reciprocation to its extended position.

As mentioned above, the device 30 also includes a selectively reciprocable machining tool 90 that includes a shaft 92 which is reciprocally receivable in slot 75 of the bushing 73. A first machining surface 96 is provided at or in close proximity to the end of the machining tool 90, and is configured to preferably machine a workpiece (e.g., 14). An engageable surface 94 extends along a portion of the outer surface 93, preferably proximally positioned relative to the machining surface 96. In certain embodiments, the shaft 92 of the machining tool 90 and the stem 68 of the piston 52 can be integrally formed, while in other embodiments, the machining tool 90 may be rigidly connected to the stem 68 of the piston 52 using techniques known in the industry, such as thread connectors, spot welding, and the like.

The device 30 may also include a second machining surface 37 attached to the tool body 34, such as protruded from the peripheral surface 35 of the device 30. When device 30 is used to machine a second portion 16 (e.g., the valve seat), one or more insert cutters 38 or some other second machining surface are preferably provided at a predetermined position and angular orientation on the peripheral surface 35. Insert cutters 38 might be preferred for machining a beveled valve seat. As those skilled in the art will appreciate, the number of insert cutters 38 used, and angular orientation of each insert cutter 38, may be varied, depending on the number of facets and required conformation of the desired valve seat or other second portion to be machined (e.g., 16). Each insert cutter 38 is preferably individually oriented to machine a specific facet in the portion 16 at the desired angle so that the desired air tight seal between the desired surface or portion 16 and valve stem (not shown) can be provided.

FIG. 5 illustrates a preferred assembly 97 for preventing rotation of the piston 52 relative to the device 30, and rotation of first machining surface 96 relative to tool body 34. For example, one or more anti-torque guides or rods 98 can be disposed in and extend along the longitudinal length of the cylinder 40 at a radial distance offset from the longitudinal axis "L". To accommodate the anti-torque rods 98, corresponding openings 99 through the head 54 of the piston 52 are provided so that the piston 52 can stroke back and forth in the cylinder 40. Additionally, the assembly 97 can serve as guides for the piston 52 as the machining tool 90 is moved or actuated from the supporting mechanism 72, and as the piston 52 and machining tool 90 moves from the supported or retracted position to the actuated position.

The present invention also contemplates that fluid may be directed through the device 30, and delivered in close proximity to the machining surface 96 to facilitate chip removal. A relatively small gap or clearance 77, such to as about 0.0005 inches (0.01 mm), can be provided between the outer surface 93 of the shaft 92 and the interior surface 76 of the bushing 73 so that the second chamber 50 is not fluidly sealed, and so that fluid communication may be established and maintained between the second chamber 50 and the distal opening 80 of the bushing 73. Fluid within the second chamber 50 can thereby be delivered or forced through the clearance 77 when piston 52 moves from the retracted position (see FIG. 2) to the actuated position (see FIG. 3), and exits the distal opening 80 in alignment with the first machining surface 96 for helping to wash away recently cut particles or chips, and for further preventing chips from clogging or otherwise interfering with the supporting mechanism 72. In this way, through-spindle coolant systems can be utilized to both reciprocate machining tool 90 between its retracted and extended positions as desired, but can also be utilized to help cool can clean portions of the workpiece being machined by first machining surface 96.

When a thin film of fluid, such as a viscous liquid, is routed through clearance 77, an effective damper or bearing is provided therein, allowing the machining tool 90 to be further supported along its longitudinal length so that first machining surface 96 remains substantially concentric with the second machining surface 37. The uniformity of the thin film of fluid enables any vibrations or radial movement encountered by the machining tool 90 while machining workpiece 14 to be effectively dampened.

Referring now back to FIG. 5, the machine spindle 24 is illustrated as including a spray opening 21 disposed on the interior surface 24A of the tool holder receiving area that is in fluid communication with a fluid supply system 23 via a spindle passage 27. In turn, spindle passage 27 is illustrated as being located off-centered from the longitudinal axis "L". In this regard, and as mentioned above, off-centered routing of a spindle passage(s) 36 within the spindle 24 could similarly be employed, but in such cases, it would be preferred to make such spindle passage(s) (e.g., 36) symmetrical with the spindle 24 to preserve balance during high speed rotation. When the device 30 is engaged within the spindle 24, auxiliary fluid communication can be established automatically between the spindle passage 27 and a tool passageway 100 at connector 99. An example of connector 99 includes an annular groove 32 that is formed in and preferably extends completely around the exterior surface 31A of the tool holder 31 adjacent the device/spindle interface 29, and is preferably provided to ensure that fluid communication is established and maintained when the device 30 is engaged in the machine spindle 24. Auxiliary fluid supply system 23 generally provides a constant source of pressurized fluid (e.g., at about 50 psi $3.45 \times 10^5$ n/m$^2$) to be routed through the spindle 24 (via spindle passage 27) and through the device 30 (via fluid passageway 100).

Tool passageway 100 is illustrated as including a duct 33, that is formed in the device 30 in a location radially offset from longitudinal axis L and in a predetermined arrangement that extends from the connector 99 (e.g., annular groove 32) and generally along the longitudinal length of the device 30. In an exemplary embodiment of the present invention, side passage 86 is formed or bored in the tool body 34 to extend generally radially inwardly, and, can establish fluid communication between the duct 33 and the second chamber 50. Opening 47 from the side passage 86 to the second chamber 50 should preferably be provided adjacent the distal radial wall 46 of the cylinder 40, as illustrated in FIG. 5 so that fluid communication can be maintained between the fluid supply system 23 and the second chamber 50, even when the volume of the second chamber 50 has been reduced because the piston 52 has been actuated (See FIG. 3).

Figure 7:
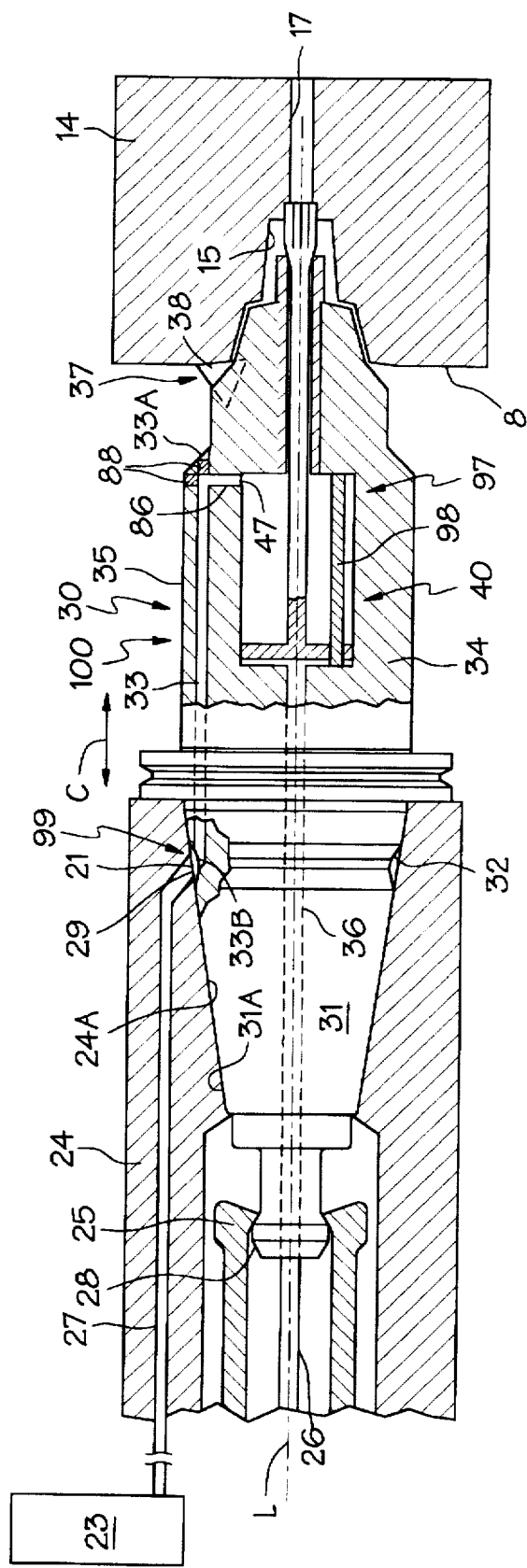
FIG. 7 is a vertical section view similar to FIG. 5, illustrating another alternative embodiment of a squirt reamer style device made in accordance with the present invention.

As will be discussed in greater detail below, directing fluid into the second chamber 50 can assist in facilitating the removal of chips from near the machining surface 96 after the machining tool 90 has been actuated, can provide a fluid support bearing for machining tool 90, and can also serve to supply a sufficient amount of fluid pressure to the second chamber 50 to provide a pneumatic spring 83, which can assist in pushing on the piston 52 and moving machining tool 90 into the retracted or secured position, as shown in FIG. 2. It is contemplated that in certain embodiments, as illustrated in FIGS. 5 and 7, spring 82 will be unnecessary and that the pneumatic spring 83 will be sufficient to return the piston 52 and attached machining tool 90 to the retracted or supported position.

Duct 33 can also extend longitudinally beyond the side passages 86 and can have first and second machining openings 33A and 33C on the peripheral surface 35 near or in close proximity to the machining surfaces 97 and 37 respectively for facilitating the removal of chips during machining operations, and/or to also assist in cooling the device 30 and the workpiece 14, even when machining tool 90 is in its retracted position and fluid flow-though opening 80 has been either restricted or effectively terminated.

If, it is not desired to utilize the duct 33, a plug assembly or metering valve could be inserted in machining openings 33A (see FIG. 8) and 33C (not shown) so that fluid flow can be regulated or controlled, or even effectively terminated. When use of fluid from the auxiliary fluid supply system 23 is not desired in a contemplated application, a plug assembly can be similarly inserted in the groove opening 33B of the duct 33. Plug assemblies, such as plug 88, can be inserted in other portions of the passageway 100 to seal off side passage 86 when it was bored in the tool body, or to seal off opening 33A to enhance the operation of pneumatic spring 83 (see FIG. 8).

The present invention also includes a method for machining a pilot hole for a first portion of a workpiece to be machined, machining a second portion of the surface (e.g., valve seat 16) to be worked, and then complete the first portion (e.g., guide hole 18) in a workpiece 14. A single combination device of the present invention can be used to both cut a pilot hole for a first portion to be machined, machine a second portion 16 in a workpiece 14, and then ream a concentrically oriented valve guide hole 18. Moreover, this combination machine tool device can be provided as described herein in the form of a quick change tool which can be used along with other changeable tools or devices in a relatively standard machining center and/or tool changer arrangement.

Referring again to FIG. 2, once the device 30 is properly positioned relative to the workpiece 14, the device 30 begins rotating about the longitudinal axis "L", and the machining center 20 moves the device 30 relative to workhead 12 (see arrows "A") so that the second machining surface 37 can engage with the rough cut surface 17 of the workpiece 14, preferably so that the second portion or surface (16) to be machined finished at the desired angular orientation. Concurrently, as the device 30 is rotating, the machining surface 96 of the machining tool 90, in a retracted or supported position, machines a starter hole 19 in the workpiece 14, which will serve as a guide for subsequent machining operations (e.g., reaming of a pre-existing hole 17). When the machining tool 90 is in its retracted position, vibrations and displacement of the machining tool 90 are minimized as the device 30 machines the starter hole 19 (i.e., completes initial machining on the first portion of a workpiece to be machined) and substantially, simultaneously, and concentrically machines the second portion (e.g., the valve seat) via second machining surface 37.

Referring again to FIG. 3, after the surface 16 is machined, the machining center 20 can be retracted, as shown by directional arrows "B," relative to the workpiece 14. Fluid is quickly routed to the first chamber 48 via the tool passage 36, which, increases the fluid pressure in the first chamber 48 to an effective actuating level, preferably from about 50 psi to about 200 psi ($3.45 \times 10^5$ n/m² to $1.38 \times 10^6$ n/m²), and more preferably about 150 psi ($1.03 \times 10^6$ n/m²), to overcome the forces of the return assembly or biasing arrangement 81, the seal 62, (if any) and the supporting mechanism 72. The effective actuating level of fluid pressure moves the machining tool 90 to its actuated or extended position.

To further enhance maintaining the concentric position of first machining surface 96 relative to the pilot hole 19, the piston 52 can be actuated (e.g., increase fluid pressure) and reciprocated as the device 30 moves away relative to the workpiece, whereby the first machining surface effectively remains in the pilot hole 19 as first machining surface 96 moves from its retracted to its extended position.

As mentioned above, as the machining tool 90 advances, the first chamber 48 increases in volume, whereby the second chamber 50 decreases in a corresponding volume as a result of the axial movement of the head 54. As the piston 52 is being moved from its retracted or supported position to its extended or actuated position, the piston 52 pushes fluid in the second chamber 50 though the clearance 77, and fluid begins to exit at the opening 80, which can assist thereafter in facilitating chip removal and cooling during further machining operations.

Machining center 20 is moved, as illustrated by directional arrows "C" in FIG. 5, relative to the workpiece 14 and the first machining surface 96 of the machining tool 90 rotates (see arrow "R") to machine (e.g., bore) the portion 18 (e.g., the guide hole for the valve stem). Once machining operations are completed, fluid pressure in the tool passage 36 and the fluid supply system 22 can be relieved or decreased sufficiently such that the return assembly or biasing arrangement 81, including, for example, either a spring 82 and/or the pneumatic spring 83, or other biasing arrangement, can move the piston 52, and thus, the machining tool 90, from the actuated position to the supported or retracted position shown in FIG. 2.

In an alternative embodiment of the present invention, after the first machining surface 16 is machined by the machining surface, and the pilot hole 19 is machined, the device 30 of the present invention is not required to retract away from the workpiece 14, rather, the fluid pressure in the tool passage 36 can be selectively and gradually increased, whereby the forces of the return assembly 81, the frictional engagement of the seal 62, if any, and the supporting mechanism 72, are overcome, and machining tool 90 is reciprocated from its retracted or secured position as illustrated in FIG. 2, and can machine the guide hole 18 as the machining tool 90 rotates (see arrow "R") and is moved toward its fully extended or actuated position, as illustrated in FIG. 4.

As discussed above, when the tool holder 31 is engaged in the machine spindle 24, fluid communication can be also established between the spindle supply line 27 and tool passageway 100 at the device/spindle interface 29. Fluid is then directed from the fluid supply system 23, through the spindle supply line 27, through the tool passageway 100, and can be delivered to the second chamber 50, so that fluid can be supplied through the clearance 77 and opening 80 for facilitating cooling and chip removal away from machining surface 96. In addition, if a viscous fluid is being used, a fluid bearing is also established that further supports machining tool 90 along at least a portion of its longitudinal length. Moreover, fluid can also be provided through the duct 33 at the machining opening 33A for assisting in cooling and the removal of chips and other debris away from machining surface 37. As illustrated in FIG. 7 when duct 33 is in fluid communication with second chamber 50, a pneumatic spring 83 can be provided to assist with returning piston 52 and first machining surface 96 to the secured or retracted position.

As can be appreciated by those in the industry, recently cut particles (e.g., shavings) and debris can make their way into the spindle area of the machining center 20 and can even become lodged on the spindle 24 or the device 30. Such particles or debris can interfere with the engagement of the device 30 in the spindle 24, and as such, the device 30 will not function (e.g., rotate) as desired, since proper alignment of the device 30 in the spindle 24 was not achieved. When devices are not engaged in the machine spindle 24, fluid from the fluid supply system 23 can be sprayed or dispersed in the area around the device/spindle interface, and assists in the removal of particles from this area so that the device 30 can be properly aligned in the spindle 24 by the automatic tool changing system.

Having shown and described the preferred embodiments of the present invention in detail, it will be apparent that modifications and variations by one of ordinary skill in the art are possible without departing from the scope of the present invention defined in the appended claims. Several potential modifications have been mentioned and others will be apparent to those skilled in the art. Accordingly, the scope of the present invention should be considered in terms of the following claims and is understood not to be limited to the details of structure and operation shown and described in the specification and drawings.

We claim:

1. An improved device for use with a machine spindle and a fluid supply system in machining a workpiece, said device comprising:

a tool body having a slot and a longitudinal axis;

a drive mechanism disposed in said tool body;

a machining tool having a first machining surface for machining the workpiece, said tool being reciprocally receivable in said slot, and being selectively movable by said drive mechanism from a retracted position to an extended position; and a supporting mechanism having an interior surface with a portion of said interior surface angularly offset from the longitudinal axis to substantially restrict movement of the machining tool relative to the tool body while positioned in said retracted position to enable accurate machining operations with said machining tool in both its retracted and extended position, as desired.

2. The device of claim 1, wherein said angular offset portion comprises a frustoconical-shaped tapered configuration, and wherein said machining device includes an engageable surface sized and configured to correspond to and engage against said interior surface when said machining tool is in its retracted position.

3. The device of claim 2, wherein said tapered configuration of the interior surface has an angle relative to said longitudinal axis of from about 20 to about 60 degrees.

4. The device of claim 3, wherein said angle is about 40 degrees.

5. The device of claim 1, further comprising;

an auxiliary fluid connector radially offset from the longitudinal axis, said connector configured to quickly and automatically establish fluid communication with the fluid supply system when said device is engaged by said spindle; and a fluid passageway disposed in said tool body having an opening on the peripheral surface of said tool body in close proximity to said machining surface.

6. The device of claim 1, further comprising a biasing arrangement disposed in said tool body for selectively reciprocating said machining device from said extended position to said retracted position.

7. The device of claim 1, wherein said supporting mechanism engages with and secures said machining tool in its retracted position by frictional interaction.

8. The device of claim 1, further comprising a second machining surface attached to said tool body.

9. The device of claim 1, wherein said support mechanism comprising a distal end and said angular offset portion being positioned adjacent said distal end.

10. The device of claim 1, wherein said support mechanism comprises a tubular shaped bushing.

11. An improved device for use with a machining center having a machine spindle, and a fluid supply system, said device comprising:

a tool body having a slot and a longitudinal axis;

a drive mechanism disposed in said tool body;

a machining device having a first machining surface and being connected to said drive mechanism and adapted for selective reciprocation within said slot from a retracted position to an extended position;

a supporting mechanism having an interior surface with a portion of said interior surface angularly offset from the longitudinal axis to substantially restrict movement of the machining device relative to the tool body while positioned in said retracted position to enable accurate machining operations with said machining device in both its retracted and extended position, as desired;

an auxiliary fluid connector configured to quickly and automatically establish fluid communication with the fluid supply system when said device is engaged with the spindle; and a biasing arrangement disposed in said tool body and configured for selectively reciprocating said machining device between said extended position and said retracted position.

12. The device of claim 11, wherein said device further comprises a supporting mechanism sized and configured to substantially restrict movement of said machining tool relative to said tool body.

13. The device of claim 11, wherein said connector is being radially offset from said longitudinal axis; and further comprising;

a fluid passageway disposed in said tool body having an opening in close proximity to said machining surface.

14. The device of claim 13, further comprising;

a second machining surface disposed on said tool body; and wherein said fluid passageway has a second opening in close proximity to said second machining surface.

15. The device of claim 11, wherein said connector further comprises an annular groove disposed in a peripheral surface of said tool body and positioned so as to be in fluid communication with the fluid supply system when said device is engaged within said spindle.

16. The device of claim 11, further comprising a second machining surface attached to said tool body.

17. The device of claim 11, wherein said biasing arrangement comprises a pneumatic spring arranged to selectively reciprocate said machining tool from its extended position to its retracted position.

18. An improved method for machining a plurality of concentric surfaces in an opening of a workpiece, said method comprising the steps of:
   (A) providing a combination machine device for use with a machine spindle and an auxiliary fluid supply system, said tool comprising:
      a tool body having a longitudinal axis, a peripheral surface and a slot;
      a drive mechanism in said tool body for receiving pressurized fluid from the fluid supply system;
      a first machining surface being selectively reciprocable relative to said tool body along said slot between a retracted position and an extended position; and
      a supporting mechanism having an interior surface with a portion of said interior surface being angularly offset from the longitudinal axis for substantially restricting movement of said first machining surface relative to said tool body and said slots while positioned in its retracted position;
   (B) machining the workpiece with said machining surface while said machining surface is positioned in its retracted position;
   (C) reciprocating said first machining surface from said retracted position to said extended position; and
   (D) machining said workpiece with said first machining surface in said extended position.

19. The method of claim 18, further comprising the step of:
   retracting the tool body relative to the workpiece prior to reciprocating said first machining surface from said retracted position to said extended position.

20. The method of claim 18, further comprising the steps of:
   providing said device having a second machining surface, and a fluid passageway having a first opening in close proximity to said first machining surface when in its retracted position, and a second opening in close proximity to said second machining surface;
   routing fluid though said fluid passageway; and
   delivering fluid in close proximity to said first and second machining surfaces during machining operations.

21. The method of claim 20, further comprising the steps of:
   providing said tool body with an auxiliary fluid connector radially offset from the longitudinal axis, said connector configured to facilitate quick and automatic establishment of fluid communication between the device and the fluid supply system when said device is engaged within the spindle, and having a fluid passageway formed in said tool body, said fluid passageway having an opening in close proximity to said first machining surface;
   routing fluid though said fluid passageway; and
   delivering fluid in close proximity to at least one of said first and second machining surfaces.

22. The method of claim 18, further comprising the steps of:
   providing a return assembly in said tool body;
   retracting said machining tool to said retracted position with said return assembly.

* * * * *

UNITED STATES PATENT AND TRADEMARK OFFICE
CERTIFICATE OF CORRECTION

PATENT NO. : 5,775,853
DATED : July 7, 1998
INVENTOR(S) : Gary Keefer, et al.

It is certified that error appears in the above-identified patent and that said Letters Patent is hereby corrected as shown below:

In the claims,

Column 14 line 53, delete "being"

Column 15 line 5, replace "tool" with --device--.

Signed and Sealed this

Fifteenth Day of September, 1998

Attest:

BRUCE LEHMAN

*Attesting Officer*   *Commissioner of Patents and Trademarks*